United States Patent

Boyd et al.

[11] Patent Number: 5,647,611
[45] Date of Patent: Jul. 15, 1997

[54] VEHICLE SAFETY BELT SYSTEM

[75] Inventors: Leslie Samuel Boyd, Antrim, Northern Ireland; Robert Thomas Kopetzky, Lonsee, Germany

[73] Assignee: European Components Co. Limited, Belfast, United Kingdom

[21] Appl. No.: 524,290

[22] Filed: Sep. 5, 1995

[30] Foreign Application Priority Data

Sep. 7, 1994 [GB] United Kingdom .................. 9418044
Sep. 28, 1994 [GB] United Kingdom .................. 9419541

[51] Int. Cl.$^6$ ................................................. B60R 22/26
[52] U.S. Cl. .................. 280/801.1; 280/807; 296/68.1; 297/468
[58] Field of Search ........................ 280/801.1, 805, 280/806, 807, 748; 296/68.1; 297/216.1, 216.13, 468

[56] References Cited

U.S. PATENT DOCUMENTS 3,365,231 1/1968 Burtt .

FOREIGN PATENT DOCUMENTS

| | | |
|---|---|---|
| 432824 | 6/1991 | European Pat. Off. . |
| 471573 | 2/1992 | European Pat. Off. . |
| 2252746 | 6/1975 | France . |
| 2627133 | 8/1989 | France . |
| 3635992 | 5/1987 | Germany . |
| 4239492 | 4/1994 | Germany . |
| 61-191453 | 8/1986 | Japan . |
| 1476399 | 6/1977 | United Kingdom . |
| 2215586 | 9/1989 | United Kingdom . |
| 2 235 124 | 2/1991 | United Kingdom . |
| 2 274 814 | 8/1994 | United Kingdom . |

*Primary Examiner*—Paul N. Dickson
*Attorney, Agent, or Firm*—Lyman R. Lyon P.C.

[57] ABSTRACT

A vehicle safety belt system of the lap and shoulder type comprises a main belt wound on a retractor, the free end of the belt being securable to the vehicle body work, a slidable tongue fitted to the main belt and a main buckle securable to the vehicle body work into which the tongue is lockingly insertable. The retractor prevents the main belt from being withdrawn when the retractor is subjected to an acceleration or deceleration in excess of a predetermined value. The retractor is mounted adjacent the top of the vehicle seat back. The retractor is prevented from moving forwardly in the event of an accident, but is releasable to allow the seat back, and with it the retractor, to be folded forward when desired.

3 Claims, 6 Drawing Sheets

VEHICLE SAFETY BELT SYSTEM

BACKGROUND OF THE INVENTION

The present invention relates to safety belt systems for vehicles.

There are a very large number of different safety belt systems available for vehicles. Initially they included the concept of what are now referred to as static belts in which the seat belt was secured rigidly to the car at two places, a tongue was slidable on the seat belt and was engageable in a buckle to provide a lap and shoulder portion of the belt. The length of the belt was adjustable to suit and individual's size.

Subsequently belts were provided with retractors in which the belt was automatically retracted and was therefore adapted to fit any passenger. The retractor was arranged to be locked by one of several different means in a situation of acceleration or deceleration beyond a predetermined value.

In recent years it has been a requirement that seat belts be provided in the back of a car and it has been traditional to provide a retractor form of lap and shoulder belt for the two side passengers and a lap belt only for the centre passenger on the back seat of a vehicle. This is now considered to be unsatisfactory and it is desirable to be able to provide relatively easily a lap and should belt, with a retractor arrangement, for the rear centre passenger also. To date no satisfactory arrangement has been provided which readily enables the seat back to be folded forwardly in an estate vehicle or in a hatch-back vehicle, or indeed in a vehicle with a boot where it is desirable to provide the facility of folding rear seats.

It has become common practice in most cars nowadays to provide the rear seat so that two different parts of the seat can fold forwardly, thus there being one portion of the seat, about 60% of the length, in which two passengers can sit, and the other portion, usually about 40%, for the other side passenger.

It would be desirable to provide a seat belt assembly which can satisfactorily be used in such vehicles.

SUMMARY OF THE INVENTION

It is now proposed, according to the present invention, to provide a vehicle safety belt system, in particular, but not exclusively, for the central rear seat passenger of a car, said system including a retractor, a main belt wound onto said retractor, means to secure the free end of said main belt to the vehicle body, a slidable tongue fitted to said main belt, a main buckle securable to the vehicle body, said tongue being lockingly insertable into said main buckle, means to prevent said retractor from allowing said main belt to be withdrawn from the retractor, when the retractor is subjected to an acceleration or deceleration in excess of a predetermined value, holding means securable on the rear of a vehicle seat back, mounting means on the retractor engageable with said holding means to position the retractor at or adjacent the top of the vehicle seat back, and releasable securing means associated with said retractor to prevent the retractor from moving forwardly in the event of an accident, but being releasable to allow the seat back, and with it the retractor, to be folded forwardly when desired.

The provision of the holding means securable to the rear of the vehicle seat back enables the retractor satisfactorily to be positioned in place but does not necessarily give adequate strength to deal with an emergency situation. This strength is provided by the securing means which are associated with the retractor and this can take a number of different forms.

In a first and presently preferred arrangement, the securing means comprise a second buckle connected to said retractor and a retaining belt attachable to the vehicle at at least one place and including a second tongue engageable in said second buckle, the arrangement being such that when the second tongue is secured in the second buckle the securing belt is taut.

A further version of such securing means comprise a reinforced parcel shelf mountable rearwardly of the upper part of the seat back, a retaining belt attached to the reinforced parcel shelf, the retaining belt including a second tongue, and the retractor having a second buckle connected thereto engageable by said second tongue, the arrangement being such that when the second tongue is secured in the second buckle the retaining belt is taut.

The parcel shelf may be a fixture in the car if it is a saloon car or may be removably mounted if the car is an estate or hatchback. If it is removably mounted, then the mounting means must be adequately robust to retain the parcel shelf and hence the retractor.

In one preferred construction the parcel shelf comprises an inner rigid frame work having laterally extending pins therefrom, these pins engaging robust metal retainer. The shelf can be completed, e.g. by upper and lower plate like members secured to the rigid frame.

In an alternative arrangement the securing means comprise a base securable to the floor of the vehicle, a pivot having an axis adapted to extend longitudinally of the vehicle, and an arm pivotally mounted and pivotable between an out-of-the way position adjacent the floor of the vehicle and an active position located behind the vehicle seat back, a second buckle connected to said retractor or said arm, a second tongue connected to said arm or said retractor, the second tongue being lockingly insertable in the second buckle.

In any of these arrangements it is preferable that a cooperating locking means be provided preventing said main belt from being unwound from said retractor unless said second tongue is engaged in said second buckle and preventing said second buckle from being released unless said main belt is fully rewound on said retractor.

In an alternative structure the securing means comprise a bolt provided at each end of a bar mounted on said holding means.

In order that the present intention may more readily be understood, the following description is given, merely by way of example, reference being made to the accompanying drawings.

DESCRIPTION OF THE PREFERRED EMBODIMENTS

Figure 1:
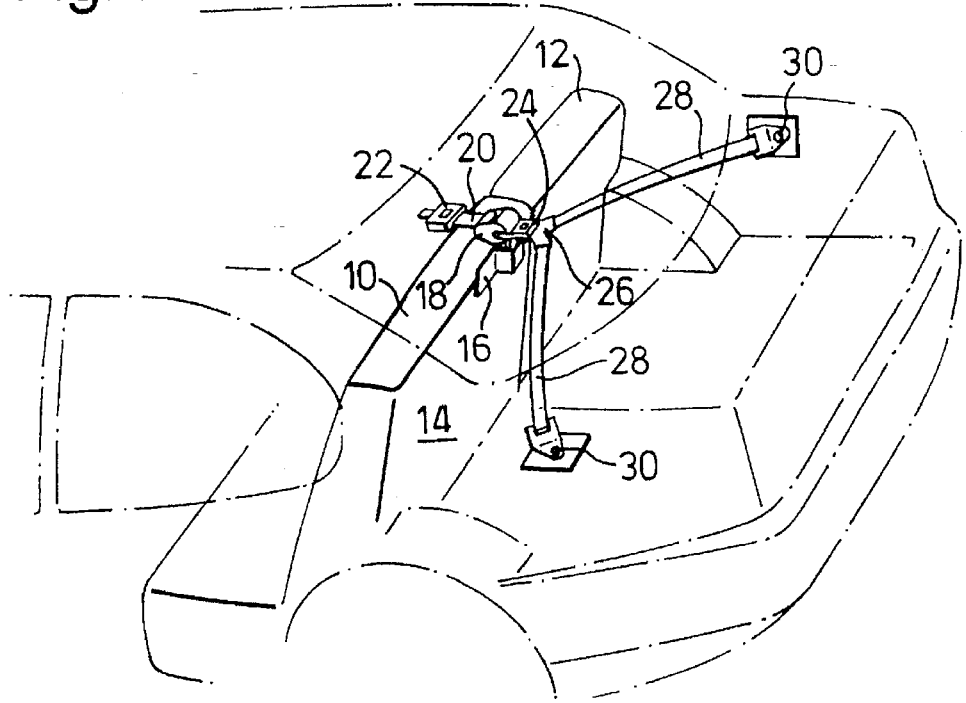
FIG. 1 is a very schematic view of a rear portion of a vehicle fitted with a safety belt system according to the invention.

In each of the vehicles illustrated the rear seat is shown as being of the "60-40" variety including a two seat portion 10 and a single seat portion 12. As shown in FIG. 1 mounted on the back 14 of the larger seat portion 10 is a holding means 16 in the form of a "bridge shaped" bracket. Located and engaged in the space formed under the bridge shaped bracket 16 is a projection extending from a standard seat belt retractor 18. This retractor may be one of a number of different standard types which include a recoil spring to wind-in a main belt 20, the retractor itself being provided with means to lock the retractor to prevent unwinding of the belt from an initially extended position around a persons body upon the occurrence of an acceleration, or more particularly, a deceleration beyond a predetermined value, e.g. in an accident situation. Thus the retractor will not allow the belt to run out at all in an accident situation.

The far end of the belt is secured at a location which cannot be seen in the drawing adjacent the gap between the two seat parts 10, 12 in much the same manner as a normal front seat belt is attached at its free end. Again as is conventional, the belt 20 has a slidable tongue 22 which the rear seat passenger in the centre of the back seat will be able to engage in a main buckle which is not shown and is secured to the floor of the vehicle either directly or via a short length of further seat belt, again as is conventional.

Associated and securely fixed to the retractor 18 is a second buckle 24. Associated with the second buckle 24 is a second tongue arrangement 26 which is shown at the centre of a retaining belt 28, the ends of which are secured at 30 to the body of the car. This securing at 30 can be at any suitable location, a particularly suitable one being at the location of the hinges of the boot of the car.

It will be appreciated that the second tongue 26 engaged in the second buckle 24 the retaining belt 28 would be taut. Thus in an accident situation it will not be possible for the retractor 18 to move forwardly even though there will be a tendency for the back seat to tip downwardly.

However, in the situation where the user does not wish to use the back seat, or at least the portion 10 thereof, the second buckle 24 can be released so that the second tongue 26 is freed and the seat can then fold downwardly taking the retractor 18 with it.

Figure 2:
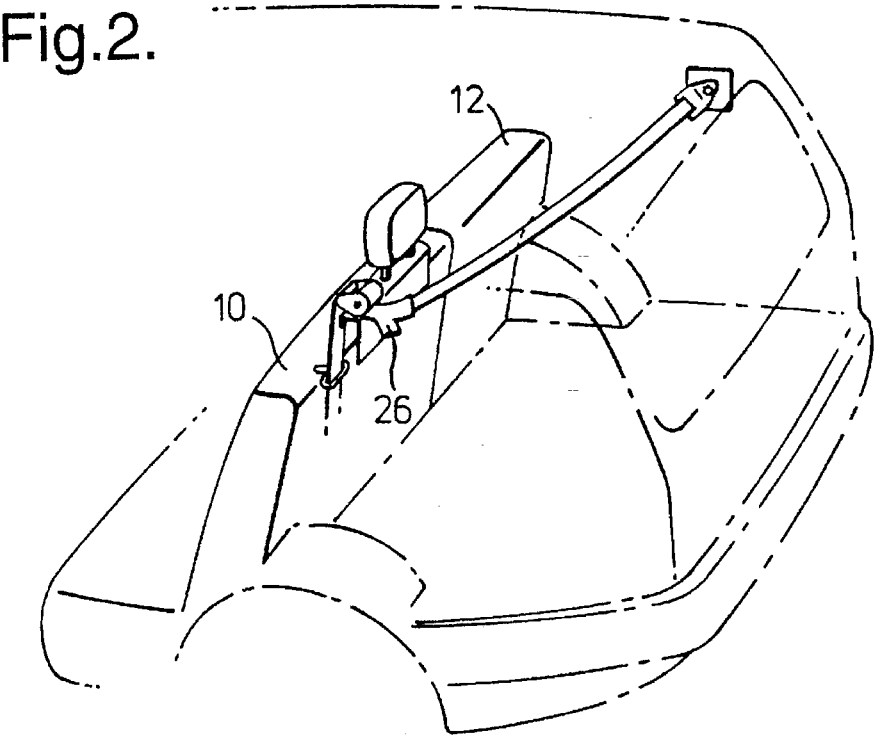
FIGS. 2 and 3 are views of modified forms of the arrangement shown in FIG. 1 applied to a hatch-back vehicle.

FIG. 2 shows a generally similar arrangement applied to a hatch-back vehicle but in this instance the retaining belt 28 extends somewhat more upwardly to the hinge location of the hatch-back. In this arrangement there is in fact shown only one retaining strap with the second tongue 26 at the end of that strap. Because the holding means 16 will adequately position the retractor 18, it is believed that such an arrangement will entirely preclude the seat part 10 from tipping forwardly in an accident situation.

Figure 3:
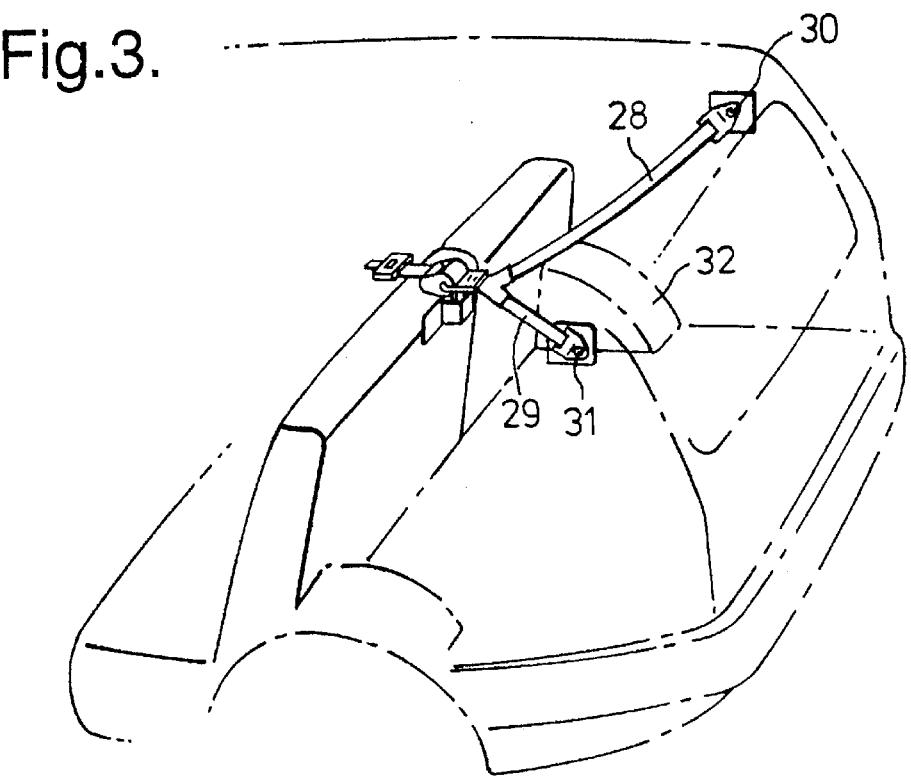
Figure 4:
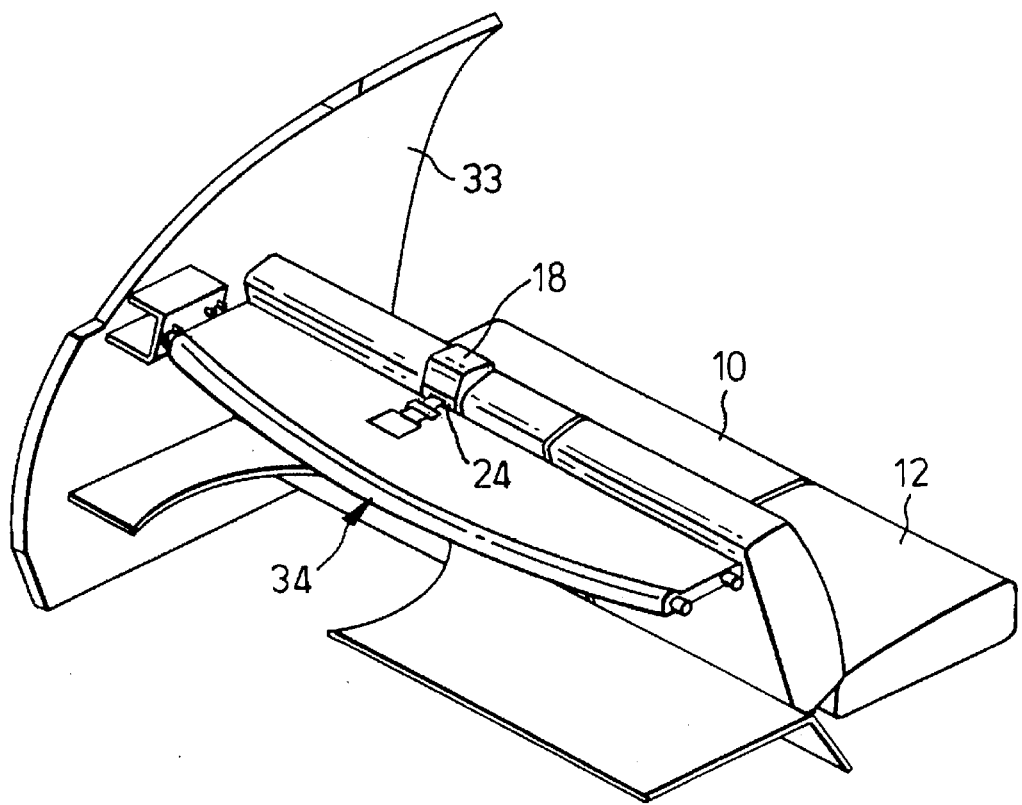
FIG. 4 is a very schematic view of a portion of a rear seat provided with a second embodiment of a safety belt system according to the invention including a parcel shelf.
Figure 5:
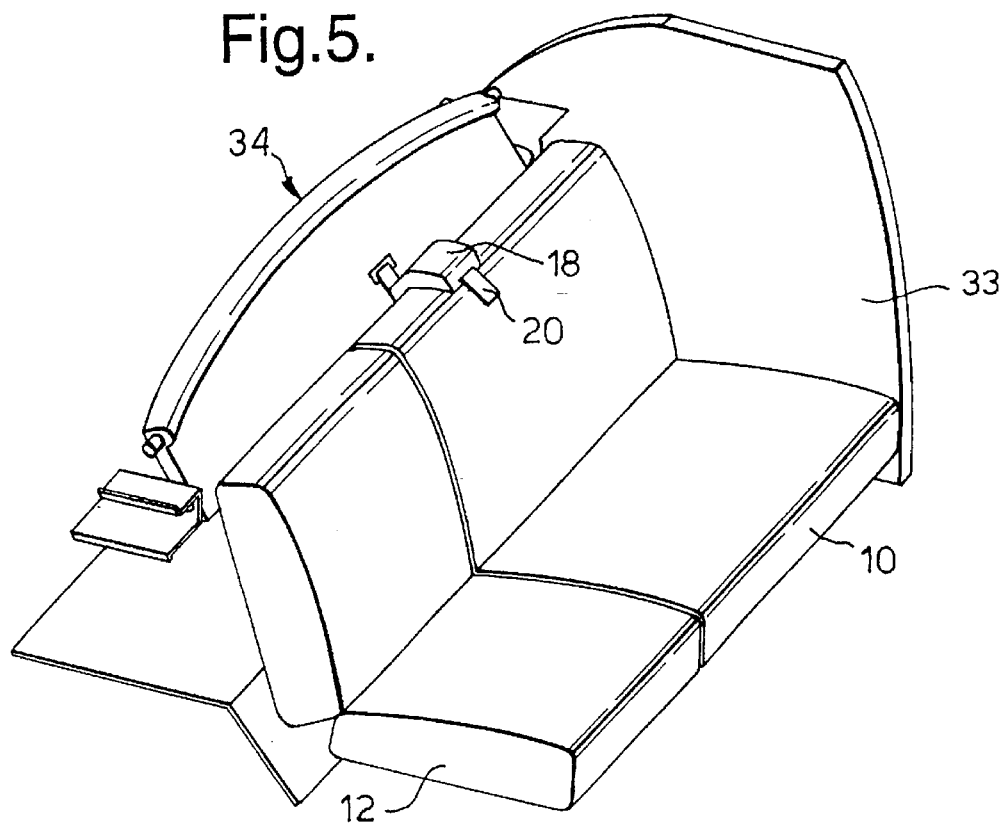
FIG. 5 is a perspective view showing the parcel shelf tilted upwardly.

FIG. 3 shows a slight modification of this arrangement in which a second anchor point 31 is illustrated for a second, somewhat shorter, part 29 of the belt 28. This anchor point 31 in this instance is shown located at the position of the wheel arch 32.

Referring now to the embodiment of the invention shown in FIGS. 4 to 7. Firstly in FIGS. 4 and 5 there is illustrated the side 33 of a car body and a 60-40 split seat 10, 12. On the larger portion 10 there is mounted by a virtue of holding means (not shown) a seat belt retractor 18. A conventional main seat belt 20 is mounted on the retractor 18 and employs its own tongue engageable with a main buckle (both not shown). A second seat belt buckle 24 is secured, by means not shown, to the retractor 18.

Figure 6:
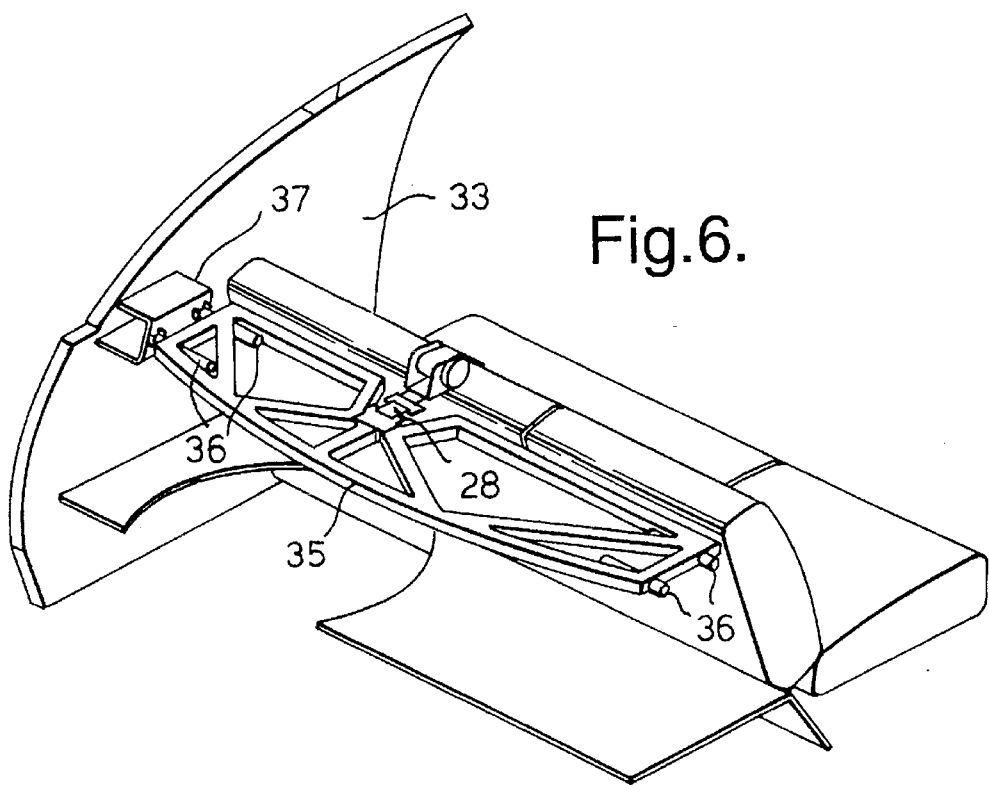
FIG. 6 is a view similar to FIG. 4 showing the structure of the strengthened parcel shelf.
Figure 7:
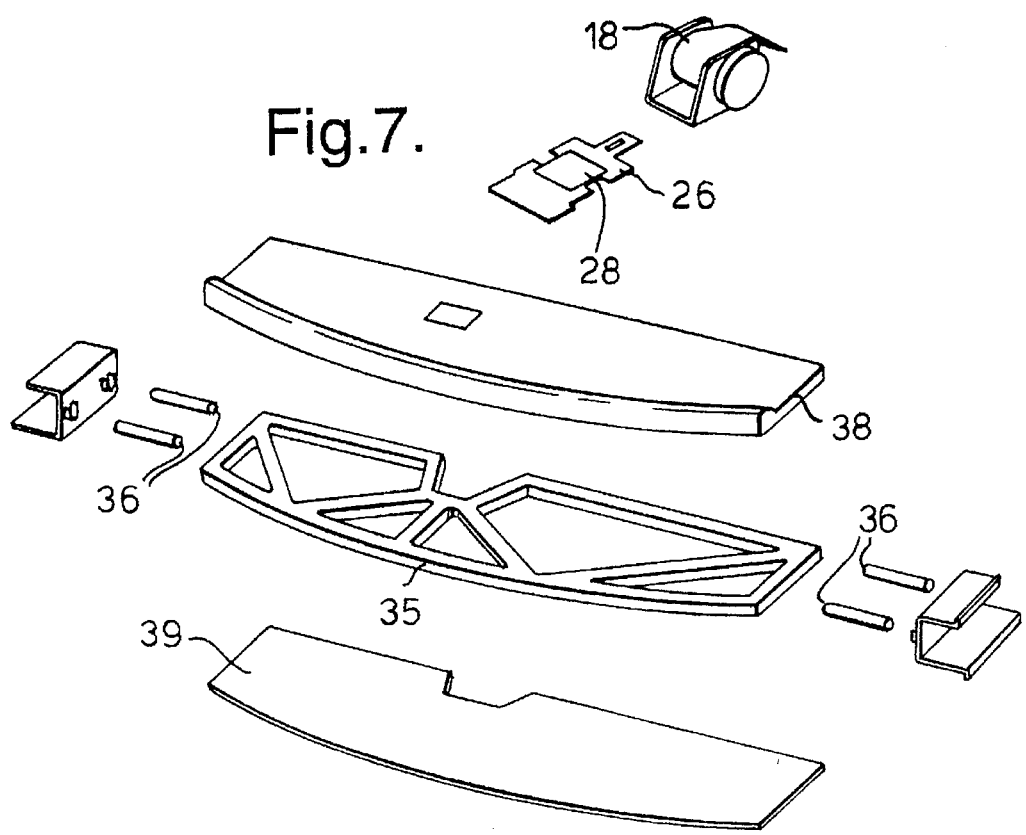
FIG. 7 is an exploded view of the parcel shelf arrangement shown in FIGS. 4, 5, and 6.

Mounted in a conventional manner behind the upper part of the back of the seat 10, 12, is a rigid reinforced parcel shelf 34. As can be seen in FIGS. 6 and 7, this consists of a rigid metal frame 35 having, on each lateral side, outwardly extending pins 36 which are engageable in a bracket 37 spot welded to the side 33 of the vehicle. Details of the brackets 37 are not indicated these can take a number of different forms. If the car is a saloon car, then the brackets will not be required to provide any means to allow the parcel shelf to be released. If it is a hatchback or estate vehicle, however, then it would be helpful to be able to remove the shelf and conventional type of mounting means may be provided enabling the back shelf to be released. However, these will be strong structures made of metal, rather than the conventional plastic structures.

It will be seen that the frame 35 has mounted thereon a short retaining belt 28 having a conventional seat belt tongue 26 secured thereto so as to be releasably engageable in the second buckle 24, thereby to ensure that the retractor 18 cannot move forwardly in an accident situation. The second buckle 24 can however be released enabling the seat back to be tilted downwardly when desired.

As can be seen in FIG. 7 the rear shelf may also include upper and lower plate like members 38, 39 rigidly secured to the frame 35.

Figure 8:
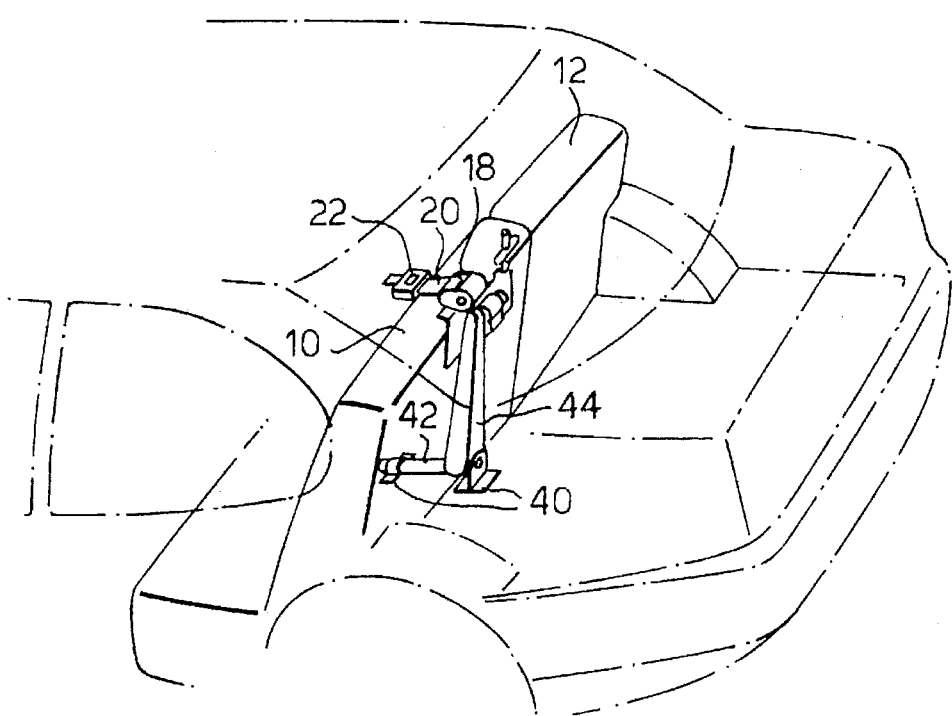
FIGS. 8 and 9 are views similar to FIG. 1 showing a third embodiment of a system according to the invention with the arm in the active and the retracted position respectively.

FIG. 8 shows a somewhat different approach. Instead of providing a retaining strap 28 secured to a distant point of the vehicle body, possibly via a parcel shelf, a retractable arm arrangement is provided. Thus a base 40 is secured to the vehicle and includes, or has associated therewith, a longitudinally extending pivot 42 upon which is pivotally mounted an arm 44 the upper end of which has thereon a second tongue 46 engageable in a second buckle (not shown) connected to the retractor 18. Thus the arm which is very rigid in its structure, e.g. being of channel cross-section, will prevent the retractor moving forwardly in an accident situation.

Figure 9:
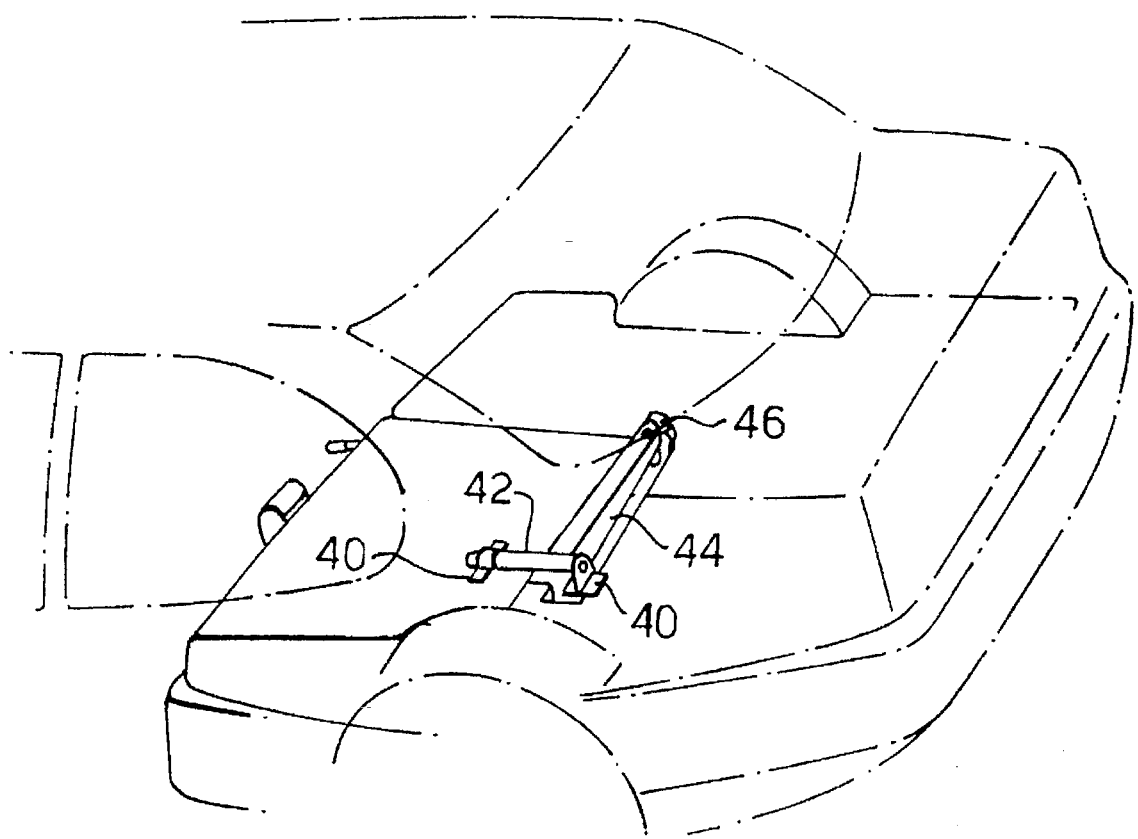

However, the second buckle (not shown) can be released and the arm 44 can be tilted down so that it abuts the floor of the boot of the vehicle as shown in FIG. 9 and the seat 10,12 can be tilted downwardly, again as shown in that figure.

Figure 10:
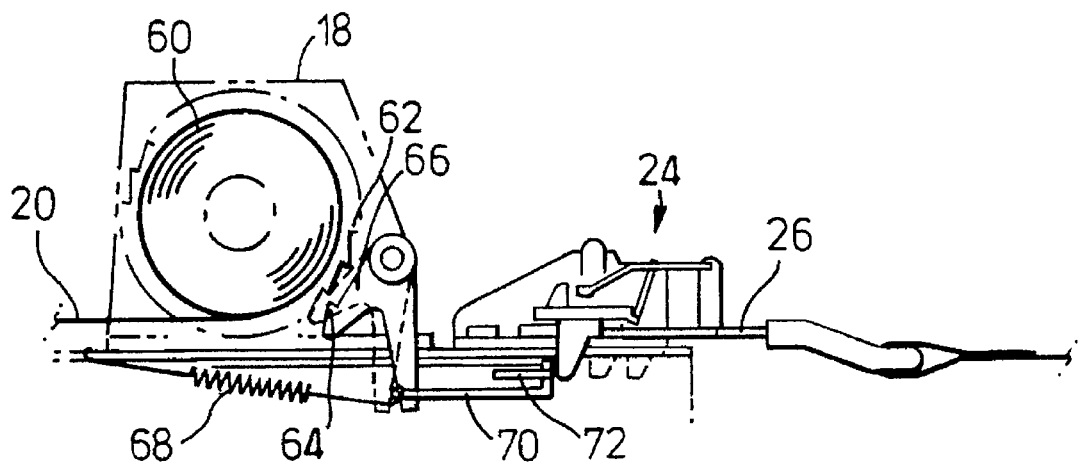
FIG. 10 is a schematic view, very much enlarged relative to the other Figures, of the cooperating locking mechanism on a retractor and second buckle of the embodiments of FIGS. 1–9.

FIG. 10 illustrates an arrangement to be used in structures of any of FIGS. 1–9. It is important that the safety belt for the centre rear passenger should not be used in any situation where the retractor 18 is capable of moving forwardly. This may be achieved by providing a facility whereby the second buckle 24 must have the second tongue 26 engaged therein before the retractor is released to enable the tongue 22 on the main belt 20 to be pulled out. Likewise the second buckle 24 must be incapable of being released unless the main belt 20 is fully wound onto the retractor 18. Thus the reel 60 in the retractor 18 is provided with a ratchet 62 engaged by a pawl 64 on a bell crank 66. When the second tongue 26 is not engaged with second buckle 24 the bell crank is tilted to the position, illustrated in broken lines in FIG. 10, engaging the ratchet, by means of a spring 68. A tilting mechanism is provided to tilt the pawl 66 to the position shown in solid lines in FIG. 10, once the tongue 26 is engaged in the second buckle 24 enabling the reel 60 to allow the belt 20 to unreel therefrom. This mechanism may, as shown, include a link 70 which moves to the right (as drawn) on engagement of the second tongue 26 with the second buckle 24. The link 70 may be pivotally attached to one end of a centrally pivoted pivot arm 72 whose opposite end is acted on either by the engaged second tongue 26 or by an ejector moved thereby.

A sensor is provided on the retractor 18 to sense whether or not the reel is full. If the reel is not full, then a shutter covers the release button on the buckle 24 to prevent the tongue 26 from being released therefrom.

Figure 11:
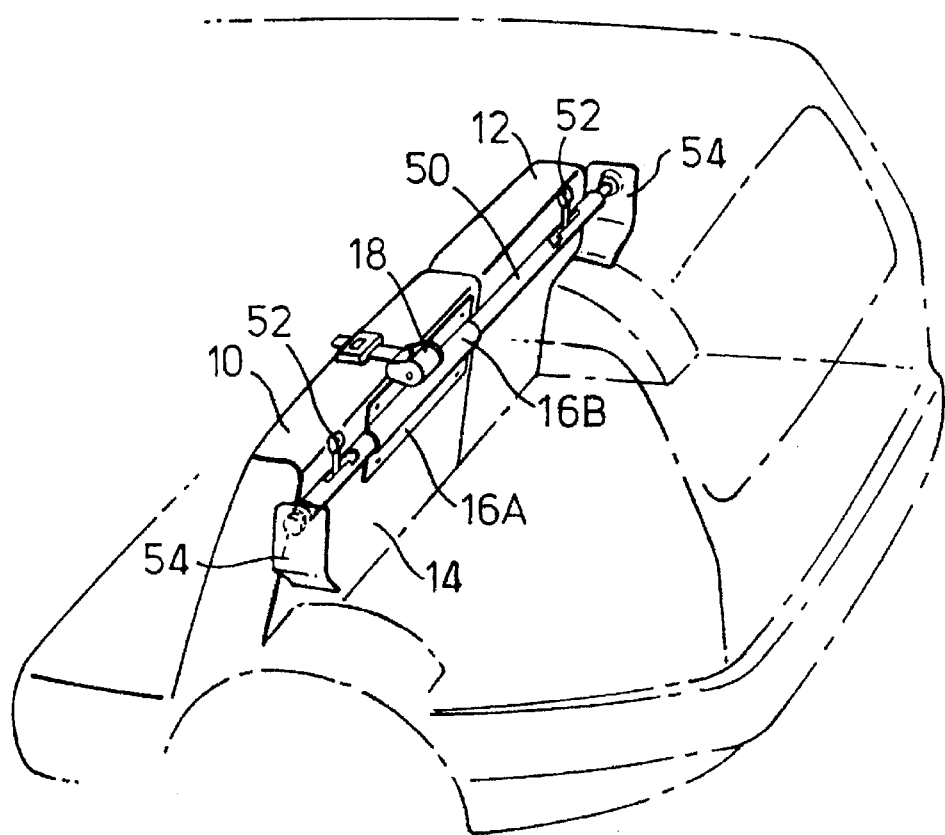
FIG. 11 is a schematic view of a fourth type of arrangement according to the invention.

Finally, FIG. 11 shows a somewhat different approach. The holding means 16A takes a somewhat different form but is still secured to the back 14 of the seat portion 10 and includes a central tunnel shaped part 16B and has the retractor 18 secured thereto by any suitable means.

Passed through the tunnel shaped portion 16B is a rigid bar or tube 50 having at each end a locking bolt 52 engageable in a locking member 54 on the side of the car at or adjacent the wheel arch. Quite clearly the locking bolt 52 can be retracted and the rear seat can be folded downwardly as before.

What is claimed is:

1. A safety belt system in a vehicle having a body, a seat and a seat back pivotable relative to the seat, said system comprising;

a seat belt retractor mounted on said seat back adjacent the top thereof, a main belt wound onto said retractor and having a free end, a main tongue on the free end of said main belt, a main buckle secured to the vehicle body and adapted to receive said tongue, first locking means in said retractor to prevent said main belt from being withdrawn from the retractor when the retractor is subjected to an acceleration or deceleration in excess of a predetermined value, a second buckle connected to said retractor, a second tongue engageable in said second buckle, non extensible means connecting said second tongue to the vehicle body whereby forward movement of the seat back is precluded when the second tongue is secured in said second buckle, said second tongue being releasable from said second buckle to allow the seat back and retractor to be folded forwardly when desired, and second locking means on said retractor for preventing said main belt from being unwound from said retractor unless said second tongue is engaged in said second buckle, said second locking means preventing said second tongue from being released from said second buckle unless said main belt is fully rewound on said retractor.

2. A system according to claim 1, wherein said vehicle has a floor and said non-extensible means comprises an arm pivotable between a position adjacent the floor of the vehicle and an active position located behind the vehicle seat back, said second tongue being connected to said arm and lockingly engageable in said second buckle when said arm is in said active position.

3. A system according to claim 1, wherein said non-extensible means comprises a bar extending across the full width of the vehicle having locking means at each end thereof for releasably engaging said vehicle body.

* * * * *